METHOD OF MANUFACTURING PLEATED FILTERS

Original Filed Oct. 25, 1966 2 Sheets-Sheet 1

INVENTORS
NILS O. ROSAEN
BONE O. ROSAEN
OSCAR E. ROSAEN

BY Hauke, Kraus, & Gifford
ATTORNEYS

METHOD OF MANUFACTURING PLEATED FILTERS

Original Filed Oct. 25, 1966 2 Sheets-Sheet 2

INVENTORS
NILS O. ROSAEN
BORJE O. ROSAEN
OSCAR E. ROSAEN
BY Hauke, Kraus, & Gifford
ATTORNEYS United States Patent Office Re. 27,094
Reissued Mar. 23, 1971

27,094
METHOD OF MANUFACTURING PLEATED FILTERS

Nils O. Rosaen, Bloomfield Hills, Borje O. Rosaen, Ann Arbor, and Oscar E. Rosaen, Grosse Pointe, Mich., assignors to Universal Filters, Inc., Hazel Park, Mich.

Original No. 3,465,413, dated Sept. 9, 1969, Ser. No. 589,329, Oct. 25, 1966, which is a continuation-in-part of Ser. No. 532,232, Mar. 7, 1966. Application for reissue Sept. 30, 1969, Ser. No. 868,952
Int. Cl. B23p *9/00*
U.S. Cl. 29—445 19 Claims

Matter enclosed in heavy brackets [ ] appears in the original patent but forms no part of this reissue specification; matter printed in italics indicates the additions made by reissue.

ABSTRACT OF THE DISCLOSURE

A method for forming a flat circular pleated filter element includes the steps of using a pair of die members to form pleats in a flat perforated metal sheet, providing an elongated corrugated spacing element between each fold to prevent collapsing, and forming an annular frame of thermosetting material around the periphery of the pleated sheet using a rotating mold member.

The invention relates to filters for fluid mediums and more specifically to an improved method of manufacturing a pleated filter having a circular supporting frame.

This application is a continuation-in-part of our application for Letters Patent filed Mar. 7, 1966, Ser. No. 532,232 and now U.S. Patent No. 3,389,031.

Our aforementioned patent discloses a novel form of pleated filter for removing foreign substances from a fluid system and in addition a novel method of manufacturing the improved pleated filter. Filters of this type have particular utility for removing foreign substances from industrial fluid mediums, such as air [and], hydraulic and lubricating oil systems. Such filters are particularly advantageous because of the large total area of filtering surface that can be disposed in the path of fluid medium.

The preferred embodiment of the improved filter disclosed in the aforementioned patent application preferably takes the form of a self-supporting sheet material which is pleated into a series of rounded sections connected by generally parallel fold sections. The pleated filtering material is provided with a framing structure formed by embedding the periphery of the pleated material in a thermosetting epoxy.

The present application discloses further improvements in pleated filters with particular emphasis on an improved method for manufacturing a pleated filter with a circular supporting frame.

The preferred method of the present invention, which will be subsequently described in greater detail, comprises the forming of a pleated element by advancing a perforated metallic flat sheet between a pair of die members each of which has a pair of parallel, spaced apart ribs having a cross section generally corresponding to the desired pleat. As the flat sheet is advanced between the die members, one of the die members is caused to mesh with the other die member with a force sufficient to deform the flat sheet to form a pleated section. The flat sheet is progressively advanced between the mutually reciprocal die members for the number of steps necessary to form the desired number of pleats.

The pleated material is then engaged with a forming block having a circular periphery and the perimeter of the pleated material is trimmed to form a circumference corresponding to the forming block. The pleated element is removed from the forming block and an elongated corrugated spacing element disposed between each of the folds to prevent collapsing. The spacing elements have a length corresponding to their associated folds; and preferably one of the spacing elements is provided with threaded sockets to engage threaded eyelets when the completed pleated element has been manufactured. Relative movement between the pleated filter element and the corrugated spacers during the remainder of the manufacturing process is prevented by wrapping a flat metal ribbon around the circumference of the filter element. An expanded metal strip is then slipped over the circumference of the filter element to overlay the ribbon member. The expanded metal strip has a mesh chosen to provide reinforcement to the circumference of the completed filter element.

The unit is then disposed in a mold supported for rotation and which defines a mold chamber having a diameter corresponding to the diameter of the completed framing structure. The mold is provided with an axial inlet opening. As the mold is rotated, the thermosetting epoxy is poured through the axial opening. The rotation causes the epoxy to form an annular frame in which the circumference of the pleated element is imbedded, including the expanded metal reinforcing member. After sufficient epoxy material has been poured in the mold to form a frame having a suitable radial thickness, the mold is rotated at slightly above room temperature (80 to 90 degrees F.) for a time sufficient to cure the epoxy. The source of heat for warming the rotation mold, preferably comes from a series of heating lamps. After the epoxy has cured, the mold continues to be rotated at room temperature until the frame has cooled. The mold is then placed into the oven and the temperature raised to 300° F. One hour after this the element is allowed to cool slowly. The mold is then opened and the framed element removed. The eyelets are engaged with the threaded sockets, and the frame surfaces and edges are finished and sanded to provide a finished product.

Thus, it can be seen that the advantages of the method of the present invention lie in the relatively few steps and the economy achieved by forming a reinforced framework of a thermosetting epoxy which provides in addition to a rigid frame, a non-corrosive filter supporting structure.

It is therefore an object of the present invention to provide a method for manufacturing an improved circular pleated filter by slipping an expanded metal reinforcing strip over the circumferential surface of a pleated, perforated metal sheet and forming a supporting structure around the periphery of the pleated element by imbedding the circumferential surface of the pleated element and the reinforcing strip in a thermosetting material.

Another object of the present invention is to improve the process of manufacturing circular pleated filters by providing a pleated perforated metal filter element having corrugated spacers disposed between each of the folds and then binding the corrugated spacers to the pleated element to prevent relative movement during the manufacturing process by wrapping a thin metallic ribbon around the circumferential edge of the filter element.

It is another object of the present invention to improve the method for manufacturing circular filters by providing a pleated filter section which is disposed in a rotatably mounted mold chamber, rotating the mold while pouring in a thermosetting epoxy of a quantity sufficient to form a circular frame of a suitable radial thickness, curing the epoxy at a raised temperature and then slowly cooling the framed element.

Still further objects and advantages of the present invention will readily occur to one skilled in the art to which he invention pertains upon reference to the following deailed description. The description makes reference to the ccompanying drawings in which.

DESCRIPTION OF A PREFERRED METHOD

Figure 1:
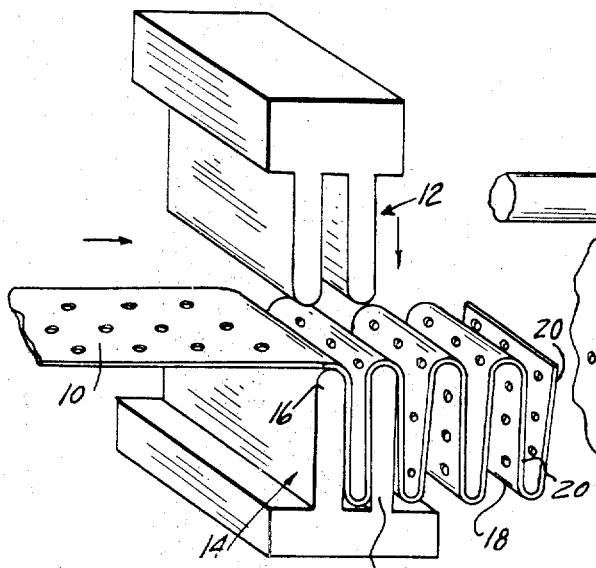
FIGURE 1 illustrates a preferred pleat-forming step.

Now referring to the drawings, the method of the inention comprises a first step of forming a pleated filter lement and which as can be seen in FIGURE 1, preferibly comprises passing a perforated, flat filter sheet 10 hrough a pair of forming dies 12 and 14. Preferably the lies 12 and 14 have a pair of spaced apart parallel rib ections 16. The die 12 is movable between a first posiion wherein it meshes with the die 14 upon the application f a force sufficient to deform the sheet 10 to a configuation generally corresponding to the cross section of the ibs 16.

The die 12 is then moved away from the die 14 a disance sufficient to permit the newly formed pleated section of the perforated sheet to be disengaged from the lie section 14 and the sheet 10 advanced to present a new lat section of material between the meshing die members. This step is repeated in succession until the required numer of pleats has been formed. It will be noted that the leated sections have rounded bends as at 18 and generally arallel sides 20.

Figure 2:
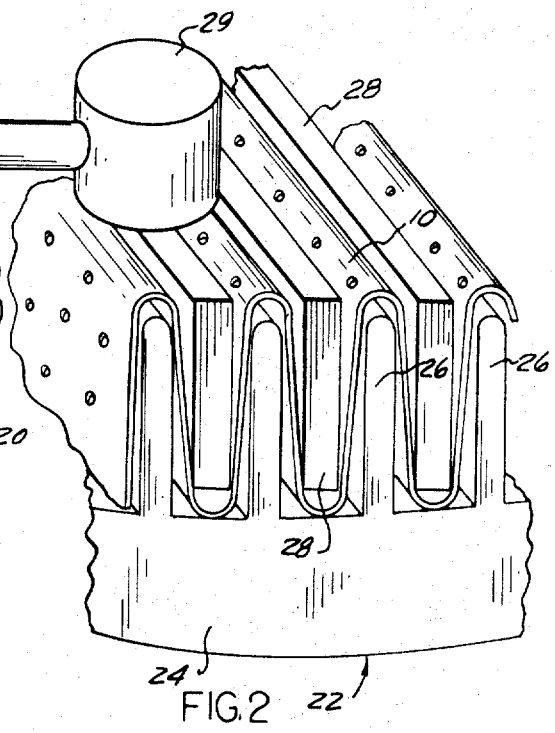
FIGURES 2 and 3 illustrate the steps of trimming the eriphery of a pleated sheet to form a circular circumerence.
Figure 3:
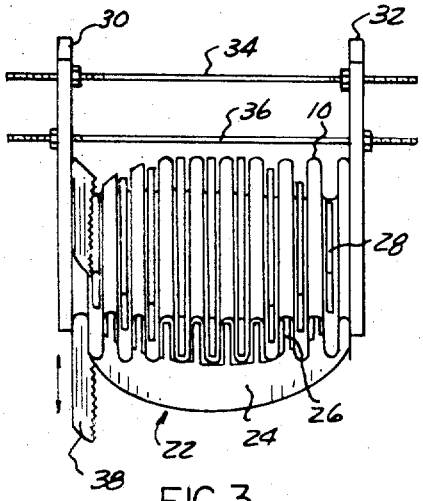

Referring now to FIGURES 2 and 3, the pleated, perorated sheet 10 is combined with a forming block 22. The forming block 22 has a circular perimeter 24 and an upper face provided with a series of spaced apart ribs 26. Ribs 26 have a thickness generally corresponding to the lesired space between the folds of the pleated element 10 and a length slightly less than the depth of the pleats. The pleated element 10 is engaged with the forming block 22 with the pleats opening on the downward side engaged with the ribs 26.

Starting with an extreme end pleat, a rigid spacing member 28 is inserted between each of the open upward facing pleats as best indicated in FIGURE 2. The spacing members 28 and pleated sheet 10 have a combined thickness which slightly exceeds the spacing between the ribs 26 so that a drive instrument, such as hammer member 29', must be used to drive the spacing members into place. This step is repeated until all of the pleats have been wedged in place between the ribs 26. Now referring to FIGURE 3, a pair of clamping members 30 and 32 are disposed on diametrically opposite sides of the forming block [24] *22* and cooperate with elongated threaded members 34 and 36 to firmly engage the pleated member 10 with the forming block 22.

A reciprocating cutting tool 38 then trims the perimeter of the pleated perforated sheet 10 to a diameter corresponding to the circumferential surface of the forming block 22. Thus, it can be seen that the periphery of the forming block serves as a pattern or template for trimming the pleated sheet 10 to the desired circular configuration. The clamp members 30 and 32 in cooperation with spacing members 28 help to prevent relative movement of the perforated pleated sheet 10, relative to the forming block 22 during the trimming operation.

Figure 4:
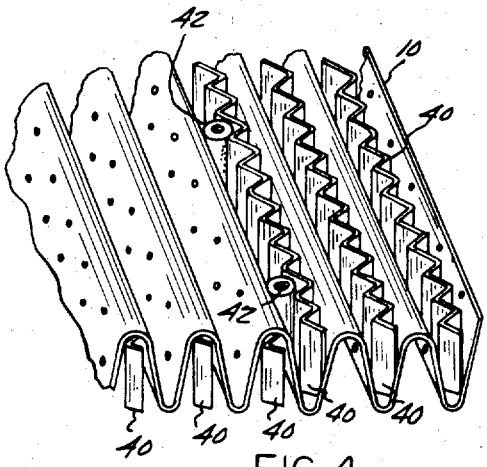
FIGURE 4 illustrates the step of inserting corrugated pacers in the folds of the pleated element.

Referring to FIGURE 4, the trimmed pleated perforated sheet 10 is separated from the forming block 22. A spacer 40 having a continuous series of corrugations is then inserted between each of the pleats. The spacers 40 have a length corresponding to the length of the pleat in which they are inserted and are inserted sequentially on both sides of the perforated element 10.

The corrugated spacers 40 function to prevent collapsing of the sides of each pleat. It can therefore be seen that the developed thickness of each of the spacers corresponds to the desired spacing between each of the pleats, and the width of each spacer generally corresponds to the depth of each pleat.

A pair of spaced apart threaded sockets 42 are fixed to one of the corrugated spacers and as will be subsequently discussed provides a means for threadably attaching a filter-carrying member.

Figure 5:
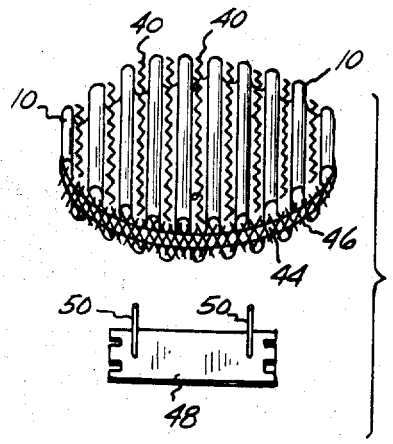
FIGURE 5 illustrates the circumference of the preerred element wrapped in the metallic ribbon and the einforcing strip.
Figure 6:
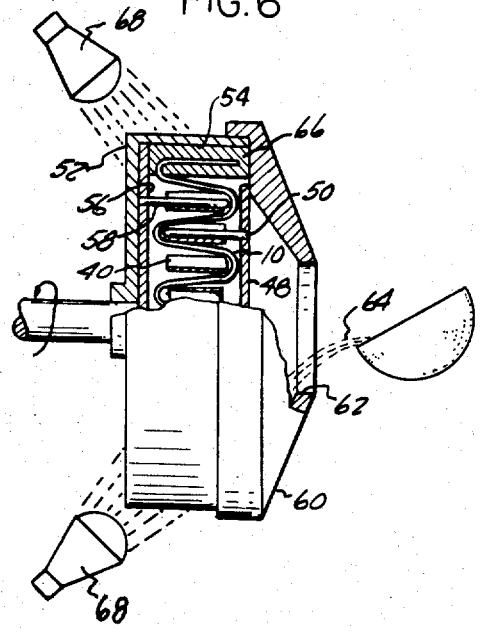
FIGURE 6 illustrates the pouring and curing steps.
Figure 7:
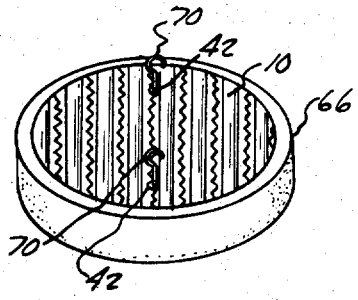
FIGURE 7 illustrates the completed filter resulting rom the improved method of the invention.

Now referring to FIGURE 5, a narrow metallic strap 44 is wrapped around the pleated perforated member 10. The strap 44 encircles the perforated sheet 10 with a force sufficient to prevent the relative displacement of the spacers [10] *40* in their associated pleats. The ends of the strap 44 are fastened together by any suitable means, such as brazing, welding, or the like.

The next step of the invention comprises slipping a strip of expanded metal 46 over the circumference of the pleated perforated sheet 10 and over the strap 44. The expanded metal strip 46 functions as a reinforcing element for the filter frame which is to be formed. The ends of the expanded strip 46 are also fastened to one another by brazing, welding, or other well-known fastening means.

A fixture 48 having a pair of spaced apart pin elements 50 is then combined with the wrapped pleated perforated filter sheet 10 by inserting the pins 50 through the corrugated spacers 40 disposed within the pleats. The pins 50 help to maintain the proper spacing of the pleats and serve to improve the rigidity of the filter sheet 10 during the frame-forming process.

The wrapped filter element 10 and the corrugated spacers 40 are then disposed in a container 52 supported for rotation and having an open-faced circular chamber 54. Preferably the chamber 54 is coated with a suitable non-stick material. An annular spacer plate 56 is carried within the chamber 54 and has a pair of spaced apart sets of guide posts 58, which extend through the corrugated spacers 40 and function to rigidly locate the perforated plate 10 in the chamber 54 during the frame-forming operation.

A frusto-conical cover 60 having an axial opening 62 is attached to the container 52. The container 52 is then rotated by suitable means (not shown) and a thermosetting plastic, such as epoxy 64, is poured through the opening 62. The epoxy 64 moves by centrifugal force to the circumferential edge of the mold chamber 54. The mold chamber 54 has a diameter slightly larger than the diameter of the pleated perforated sheet 10, so that the epoxy begins to form a circular filter frame 66. The frame 66 increases radially inwardly until the peripheral edges of the pleated perforated filter sheet 10, the extreme ends of the corrugated spacers 40, the strap 44, and the expanded metal reinforcing strip 46 are imbedded therein. When the frame 66 has developed to a proper thickness, the epoxy pouring step is terminated and the container 52 rotated at a temperature slightly above normal room temperature. It has been found that a curing temperature of 80 to 90 degrees permits the epoxy to take a proper set. Preferably, the heat is supplied from a series of heating lamps 68 which are distributed so as to evenly heat the frame 66 within the mold chamber 54.

When the frame 66 has assumed a solid state, the lamps 68 are removed, and the container 52 rotated for a time sufficient to permit the frame 66 to cool; and which is preferably accomplished at room temperature. When the frame 66 has cooled, the rotation of the container 52 is terminated.

The mold is then placed in an oven at a temperature of about 300° F. for a period of about one hour. The mold is removed from the oven and the element permitted to cool at a slow rate. The cover 60 is separated from the container 52, and the framed-filter element 10 is removed from the mold chamber 54. Preferably, the sides of the frame 66 are sanded and the edges finished. An eyelet 70 is threadedly engaged with each of the threaded sockets 42 and [provide] *provides* a means for carrying the completed circular filter member.

It has been found that a preferred thermosetting epoxy is a commercially available material marketed under the trade name "Maraset," comprising 644 F–2 resin epoxy with No. 75 hardener by Marblette Corporation, Long Island City, N.Y.

It is to be understood, however, that the epoxy which is to be used for the frame can be replaced by other suitable thermosetting materials and for strength can comprise an epoxy provided with metallic bases.

It is to be understood that although we have described the preferred method for producing circular pleated filters, various changes and modifications can be made without departing from the spirit of the invention as expressed by the scope of the appended claims.

We claim:

1. A method of manufacturing a pleated filter having a circular supporting frame, comprising the steps of:

forming a continuous series of pleats in a flat strip of perforated material;

inserting the folds forming the pleats in the material into a forming block having a plurality of spaced apart substantially parallel rib sections;

wedging a rigid spacer member between each of the folds of the pleated material so that the sides of the folds are tightly pressed against the rib sections of the forming block;

trimming the peripheral edge of the pleated material to form a circumferential edge corresponding to the perimeter of the forming block;

inserting a spacer element interjacent each of the folds, such spacer elements adapted to maintain a predetermined spacing between the sides of the folds;

wrapping a flexible, elongated strap around the circumferential side edge of the pleated material and the spacer elements to prevent relative movement thereof; and imbedding the circumferential side edge of the pleated material in a thermosetting plastic to form a support structure.

2. A method of manufacturing a pleated filter element having a circular supporting frame, comprising the steps of:

pleating a sheet of fluid pervious material to form a continuous series of bends connected by folds;

inserting a spacer element interjacent each of said folds, such spacer elements adapted to maintain a predetermined spacing between the sides of said folds;

wrapping a flexible, elongated strap around the circumferential side edge of the pleated material and spacer elments to prevent relative movement thereof;

disposing the wrapped pleated material in a housing supported for rotation and defining a mold section having an axial opening;

rotating the housing and the contents disposed therein;

pouring a thermosetting fluid through the opening and into the housing in a quantity sufficient to form an annular layer enclosing the circumferential side edge of the pleated material;

heating the contents of the rotating housing for a time sufficient for the thermosetting material to assume a solid state; and cooling the contents of the rotating housing.

3. A method of manufacturing a pleated filter having a circular supporting frame comprising the steps of:

inserting a sheet of perforated material between a forming block having a plurality of spaced apart substantially parallel rib sections and a rigid member capable of being positioned intermediate the rib sections of the forming block;

moving the rigid member and the forming block relatively one toward the other to form a continuous series of pleats in the material;

trimming the peripheral edge of the pleated material to form a circular circumferential edge;

inserting a spacer element interjacent each of the folds formed in the pleated material, such spacer elements adapted to maintain a predetermined spacing between the sides of the folds;

wrapping a flexible, elongated strap around the circumferential side edge of the pleated material and spacer elements to prevent relative movement thereof; and imbedding the circumferential side edge of the pleated material in a thermosetting plastic to form a support structure.

4. A method of manufacturing pleated filter elements as defined in claim 1, wherein one of said spacer elements carries a threaded socket adapted to accommodate a filter carrying member.

5. A method of manufacturing pleated filter elements as defined in claim 1, wherein said perforated material is metal and said pleat-forming step includes forming a series of regularly spaced grooves in the perforated metal sheet using a pair of die members, each having a plurality of regularly spaced apart and parallel rib sections, and said die members movable into and out of a meshing position with a force sufficient to deform said metal sheet.

6. A method of manufacturing pleated filter elements as defined in claim 2, wherein said thermosetting material is heated at a temperature slightly above room temperature and cooled at room temperature.

7. A method of manufacturing pleated filter elements as defined in claim 2, wherein the relative spacing between the folds is maintained by inserting a rigid pinned member interjacent the folds prior to the rotating step.

8. A method of manufacturing pleated filter elements as defined in claim 3, including the step of encircling the circumferential side edge of said pleated material in a meshed reinforcing element.

9. A method as defined in claim 3, wherein each of said spacer elements has a corrugated configuration and has a length corresponding to the length of [their] *its* associated fold.

*10. A method of manufacturing a pleated filter having a supporting frame, comprising the steps of:*

*forming a continuous series of pleats in a flat strip of perforated material;*

*inserting the folds forming the pleats in the material into a forming block having a plurality of spaced apart substantially parallel rib sections;*

*wedging a rigid spacer member between each of the folds of the pleated material so that the sides of the folds are tightly pressed against the rib sections of the forming block;*

*trimming the peripheral edge of the pleated material to form a circumferential edge corresponding to the perimeter of the forming block;*

*inserting a spacer element interjacent each of the folds, such spacer elements adapted to maintain a predetermined spacing between the sides of the folds;*

*wrapping a flexible, elongated strap around the circumferential side edge of the pleated material and the spacer elements to prevent relative movement thereof; and*

*imbedding the circumferential side edge of the pleated material in a hardenable material to form a support structure.*

*11. A method of manufacturing a pleated filter element having a supporting frame, comprising the steps of:*

*pleating a sheet of fluid pervious material to form a continuous series of bends connected by folds;*

*inserting a spacer element interjacent each of said folds, such spacer elements adapted to maintain a predetermined spacing between the sides of said folds;*

*wrapping a flexible, elongated strap around the circumferential side edge of the pleated material and spacer elements to prevent relative movement thereof;*

*disposing the wrapped pleated material in a housing supported for rotation and defining a mold section having an axial opening;*

*rotating the housing and the contents disposed therein;*

*pouring a hardenable fluid material through the opening and into the housing in a quantity sufficent to form a layer enclosing the circumferential side edge of the pleated material; and*

*rotating the housing for a time sufficent for the fluid material to assume a solid state.*

*12. A method of manufacturing a pleated filter having a supporting frame comprising the steps of:*

*inserting a sheet of perforated material between a forming block having a plurality of spaced apart substantially parallel rib sections and a rigid member capable of being positioned intermediate the rib sections of the forming block;*

*moving the rigid member and the forming block relatively one toward the other to form a continuous series of pleats in the material;*

*trimming the peripheral edge of the pleated material to form a circumferential edge;*

*inserting a spacer element interjacent each of the folds formed in the pleated material, such spacer elements adapted to maintain a predetermined spacing between the sides of the folds;*

*wrapping a flexible, elongated strap around the circumferential side edge of the pleated material and spacer elements to prevent relative movement thereof; and*

*imbedding the circumferential side edge of the pleated material in a hardenable material to form a support structure.*

*13. A method of manufacturing pleated filter elements are defined in claim 10, wherein one of said spacer elements carries a threaded socket adapted to accommodate a filter carrying member.*

*14. A method of manufacturing pleated filter elements as defined in claim 10, wherein said perforated material is metal and said pleat-forming step includes forming a series of regularly spaced grooves in the perforated metal sheet using a pair of die members, each having a plurality of regularly spaced apart and parallel rib sections, and said die members movable into and out of a meshing position with a force sufficent to deform said metal sheet.*

*15. A method of manufacturing pleated filter elements as defined in claim 11, wherein the relative spacing between the folds is maintained by inserting a rigid pinned member interjacent the folds prior to the rotating step.*

*16. A method of manufacturing pleated filter elements as defined in claim 12, including the step of encircling the circumferential side edge of said pleated material in a meshed reinforcing element.*

*17. A method as defined in claim 12, wherein each of said spacer elements has a corrugated configuration and has a length corresponding to the length of its associated fold.*

*18. A method of manufacturing a pleated filter having a supporting frame, comprising the steps of:*

*forming a continuous series of pleats in a flat strip of perforated material;*

*inserting the folds forming the pleats in the material into a forming block having a plurality of spaced apart rib section;*

*wedging a spacer member between each of the folds of the pleated material so that the sides of the folds are urged toward the rib sections of the forming block;*

*trimming the peripheral edge of the pleated material;*

*inserting a spacer element interjacent each of the folds, such spacer elements adapted to maintain a predetermined spacing between the sides of the folds;*

*wrapping a flexible, elongated strap around the circumferential side edge of the pleated material and the spacer elements to prevent relative movement thereof; and*

*imbedding the circumferential side edge of the pleated material in a hardenable material to form a support structure.*

*19. A method of manufacturing a pleated filter elemen having a supporting frame, comprising the steps of:*

*pleating a sheet of fluid pervious material to form a continuous series of bends connected by folds;*

*inserting a spacer element interjacent each of said folds, such spacer elements adapted to maintain a predetermined spacing between the sides of said folds;*

*wrapping a flexible, elongated strap around the circumferential side edge of the pleated material and spacer elements to prevent relative movement thereof;*

*disposing the wrapped pleated material in a housing supported for rotation and defining a mold section;*

*rotating the housing and the contents disposed therein;*

*delivering a hardenable fluid material to said mold section in a quantity sufficient to form a layer enclosing the circumferential side edge of the pleated material; and*

*rotating the housing for a time sufficient for the fluid material to assume a solid state.*

References Cited

The following references, cited by the Examiner, are of record in the patented file of this patent or the original patent.

UNITED STATES PATENTS

| | | | |
|---|---|---|---|
| 2,681,155 | 6/1954 | Graham | 210—493 |
| 2,970,699 | 2/1961 | Leuthesser et al. | 210—493X |
| 2,973,833 | 3/1961 | Cook | 55—521X |
| 3,144,315 | 8/1964 | Hunn | 55—521X |
| 3,177,637 | 4/1965 | Davis | 55—521X |
| 3,246,457 | 4/1966 | De Baun | 55—521X |
| 3,308,958 | 3/1967 | Berger et al. | 210—493X |
| 3,310,177 | 3/1967 | Briggs et al. | 29—493X |
| 3,315,336 | 4/1967 | Parker et al. | 29—163.5 |

FOREIGN PATENTS

| | | |
|---|---|---|
| 680,211 | 10/1952 | Great Britain. |
| 806,109 | 12/1958 | Great Britain. |
| 6,769 | 12/1958 | Great Britain. |

CHARLIE T. MOON, Primary Examiner

U.S. Cl. X.R.

29—460, 469